G. A. AICHER.
MACHINE FOR CUTTING PAPER INTO SHEETS AND INTERFOLDING THE SHEETS.
APPLICATION FILED OCT. 2, 1915.

1,273,567.

Patented July 23, 1918.
5 SHEETS—SHEET 3.

WITNESSES:

INVENTOR.
Gustav A. Aicher.
BY John H. Miller
ATTORNEY.

G. A. AICHER.
MACHINE FOR CUTTING PAPER INTO SHEETS AND INTERFOLDING THE SHEETS.
APPLICATION FILED OCT. 2, 1915.

1,273,567.

Patented July 23, 1918.
5 SHEETS—SHEET 4.

WITNESSES:

INVENTOR.
Gustav A. Aicher,
by John H. Miller
ATTORNEY.

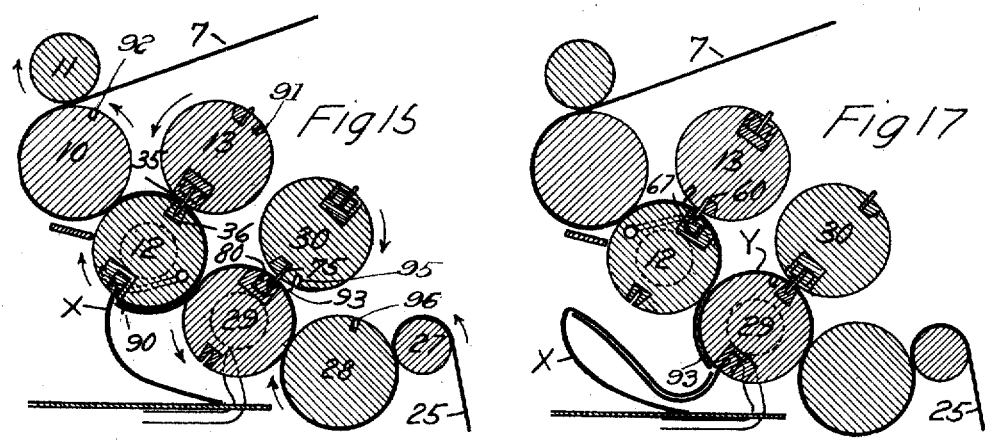

UNITED STATES PATENT OFFICE.

GUSTAV A. AICHER, OF SAN FRANCISCO, CALIFORNIA, ASSIGNOR TO NATIONAL PAPER PRODUCTS CO., OF SAN FRANCISCO, CALIFORNIA, A CORPORATION OF CALIFORNIA.

MACHINE FOR CUTTING PAPER INTO SHEETS AND INTERFOLDING THE SHEETS.

1,273,567.     Specification of Letters Patent.     Patented July 23, 1918.

Application filed October 2, 1915. Serial No. 53,704.

*To all whom it may concern:*

Be it known that I, GUSTAV A. AICHER, a citizen of the United States, and a resident of the city and county of San Francisco and State of California, have made a new and useful invention—to wit, Machine for Cutting Paper into Sheets and Interfolding the Sheets; and I do hereby declare the following to be a full, clear, concise, and exact description thereof.

The invention contemplates a machine for cutting paper into sheets of definite lengths, and interfolding the sheets successively into a package for use.

The sheets when so interfolded may be separately pulled off the package so that they may be used as paper towels in a paper towel dispenser or may be otherwise used.

In this specification and the annexed drawings, I illustrate the invention in the form which I consider the best, but it is to be understood that I do not limit myself to such form because the invention may be embodied in other forms, and it is also to be understood that in and by the description herein, I intend to cover the invention in whatever form it may be embodied.

Refering to the drawings accompanying this specification and annexed thereto:

Fig. 13 is a view of a detail of construction of the conveyer for conveying the interfolded sheets from the machine.

Fig. 14 is a view of a package of interfolded sheets which have been interfolded on the machine.

Figs. 15 to 20 inclusive are views illustrating successively the sheet interfolding operation of the machine.

Figure 11:
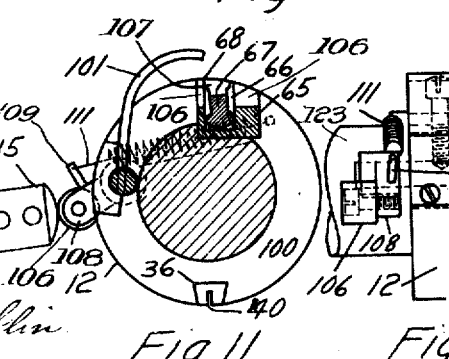
Fig. 11 is a view similar to Fig. 10, showing the ejecting finger in its ejecting position.
Figure 12:
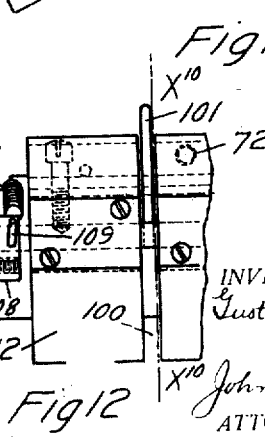
Fig. 12 is a side elevation of a portion of the roller as shown in Fig. 11.

Fig. 21 is a view illustrating the gripping jaw operating means of the roller shown in Figs. 11 and 12.

Fig. 22 is a fragmentary section of the roller shown in Fig. 21, taken on line 22.

Fig. 23 is a view of the conveyer friction device.

In the drawings 1 indicates a base upon which a main frame 2 is mounted. Paper supply rolls 3 and 4 are respectively journaled in the main frame 2 at 5 and 6. A paper web 7 leads from the roll 3 over idler 8 journaled in an arm 9 extending from the frame 2, then between feed roller 10 and pressure roller 11, then between feed roller 10 and cutter and folder roller 12, and then between cutting, creasing and folding rollers 12 and 13, said feed roller and said cutting, creasing and folding rollers being journaled in the upper part 14 of a supplemental frame 15 which is secured to the main frame 2, and said pressure roller being journaled in rock arms $11^x$ mounted in said frame part 14. The upper part 14 of the frame 15 is hinged at its lower edge at 16 to the lower part 17 of said frame. The upper side edge of the upper part 14 is held to the lower part 17 of the frame 15 by a clamp 18 which is hinged to the lower part 17 at 19. A paper web 25 leads from the roll 4 around an idler 26 journaled in the frame 2, then over pressure roller 27, and between said pressure roller and feed roller 28, then between said feed roller and cutting, creasing and folding roller 29 and then between cutting, creasing and folding rollers 29 and 30, said pressure roller 27 being journaled in rock arms 31 mounted in the lower part 17 of the frame 110

Figure 1:
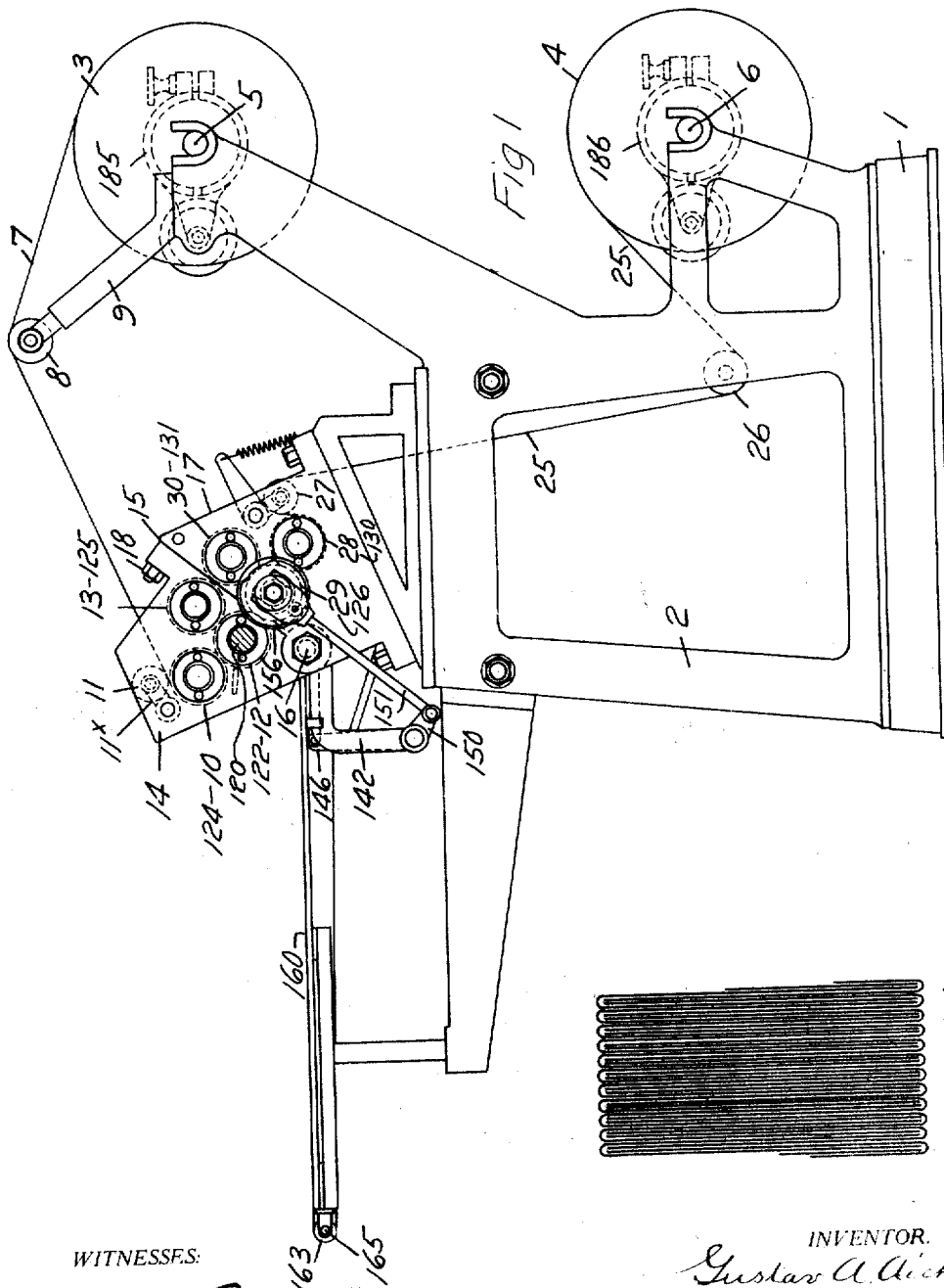
Figure 1 is a side elevation of a machine embodying my invention.
Figure 2:
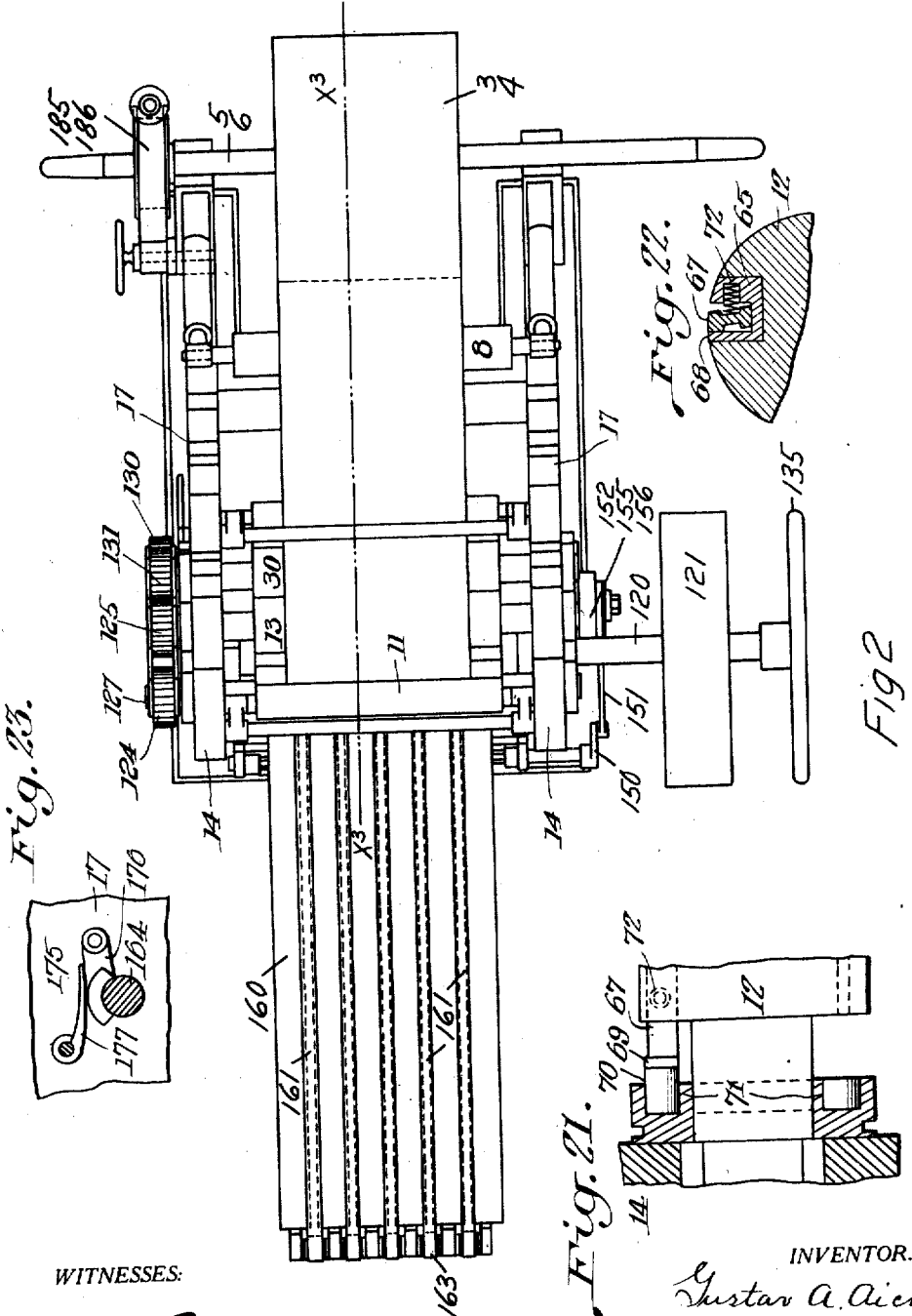
Fig. 2 is a plan view of said machine.
Figure 3:
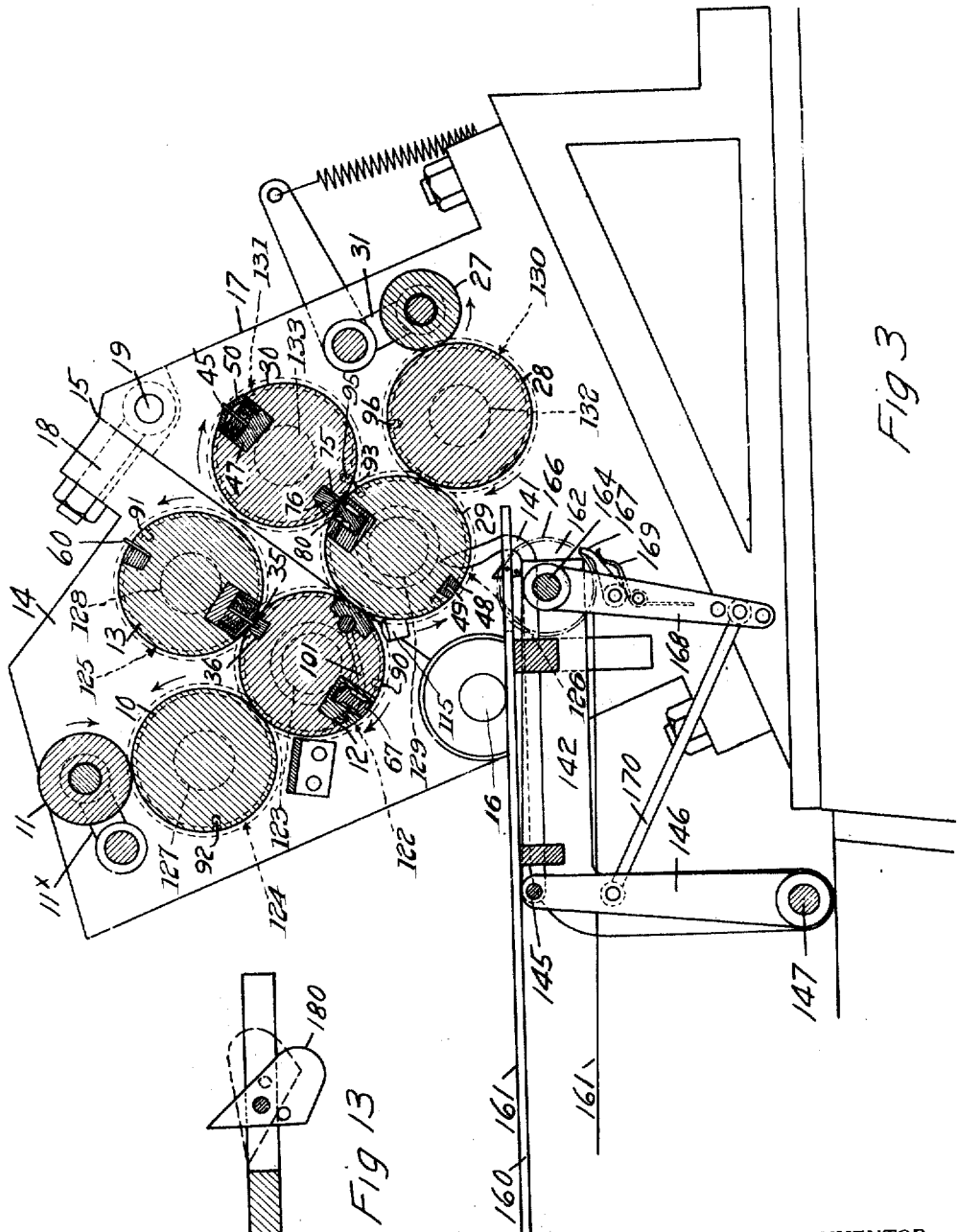
Fig. 3 is an enlarged longitudinal section of the upper portion of the machine taken on line $x^3$—$x^3$ of Fig. 2.
Figure 4:
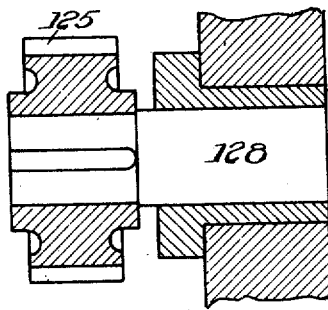
Fig. 4 is a view of a portion of one of the cutting, creasing and folding rollers, its journal and gear secured on its journal.
Figure 5:
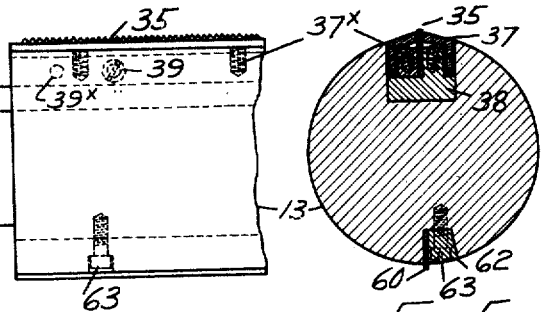
Fig. 5 is a cross section of the roller shown in Fig. 4.
Figure 7:
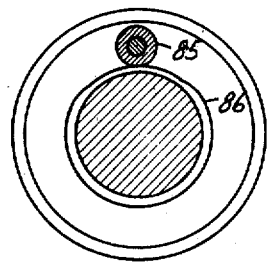
Fig. 7 is a cross-section on line $x^7$—$x^7$ of Fig. 6 showing said cam and the roller engaging it.
Figure 6:
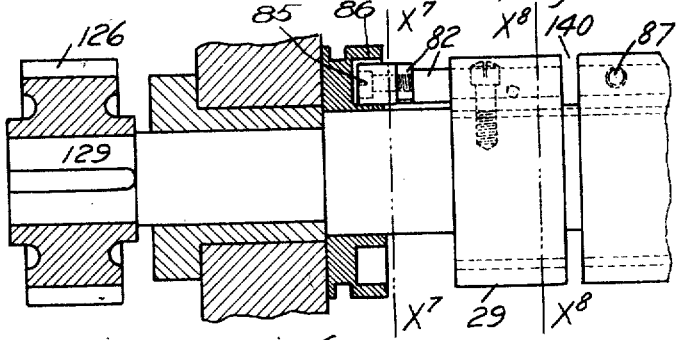
Fig. 6 is a view of one of the other cutting, creasing and folding rollers, its journal and gear secured thereon and the cam engaging arm for actuating the creasing jaws on said roller.
Figure 8:
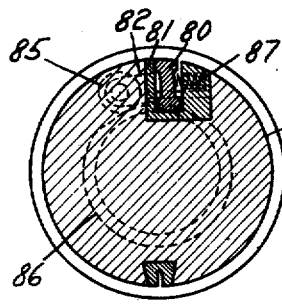
Figs. 8 and 9 are cross sections of the roller shown in Fig. 6 taken on line $x^8$—$x^8$ of said figure showing two positions of the roller and creasing jaws.
Figures 9, 10:
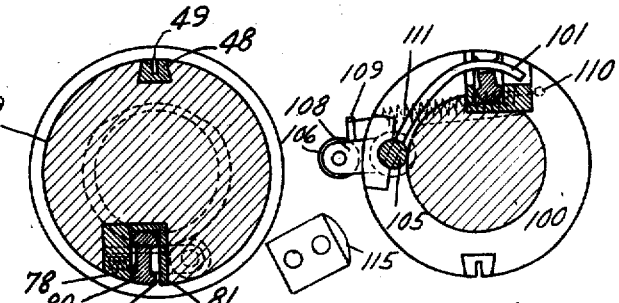
Fig. 10 is a cross section of the roller shown in Fig. 12 taken on the line $x^{10}$—$x^{10}$, Fig. 6, illustrating the ejecting fingers for ejecting the sheets from the roller, said finger being shown in its normal inoperative position.

15, and said feed and said cutting, creasing and folding rollers being journaled in said frame part 17. Means which will be described hereinafter are provided for rotating the rolls 10, 12, 13, 29, 30 and 28. The webs 7 and 25 after they pass respectively between the rollers 12 and 13 and between the rollers 29 and 30 pass between the rollers 12 and 29, which are journaled close together so that they grip and draw said webs between them when they are rotated. Means are provided on the rollers 12 and 13 for cutting the web 7 into definite lengths as the web passes between said rollers. Said means comprise a toothed knife 35 on the roller 13, a knife co-acting member 36 on the roller 12 and a spring pressed stripper 37 reciprocally mounted in the roller 13 and normally pressed beyond the periphery of the roller 13 by springs 37×. The knife 35 is preferably secured to a bar 38 counter-sunk within the roller 13, by means of screws 39. The stripper 37 is retained in operative position on the roller 13 by dowels 39× which extend through the bar 38 and the sides of the stripper and permit the stripper to adapt itself to the surface of the contacting roller 12. The knife co-acting member 36 is provided with a slot 40 adapted to receive the cutting edge of the knife 35 during the rotation of the rollers 12 and 13, whereby the web 7 is cut. When said rollers are rotated so that the knife and co-acting member come together to cut the web, the engagement of the periphery of the roller 12 with the stripper 37 presses the outer surface of the stripper against the tension of the springs 37× inwardly with relation to the roller 13, into registration with the periphery of said roller. When the web has been cut by the knife and the rollers continue to rotate and move the knife and coacting member away from each other, the springs 37× press the stripper 37 outwardly with relation to the periphery of the roller 13 and strip the paper from the knife. Means are provided on the rollers 29 and 30 for cutting the web 25 into definite lengths as the web passes between said rollers. Said means are similar in construction and operation to the cutting means on the rollers 12 and 13 as above described and comprise a toothed knife 45 secured by screws 46 to a bar 47 countersunk within the roller 30, a knife co-acting member 48 on the roller 29 which member is provided with a slot 49 to receive the edge of said knife, and a spring pressed stripper 50 reciprocally mounted in the roller 29 and under tension of springs 51, said stripper being retained in operative relation on the roller 30 by dowels 52 which extend through the bar 47 and the sides of the stripper. Means are provided on the rollers 12, 13, 29 and 30 for folding the sheets cut from the webs 7 and 25 and for interfolding said sheets with each other which means will now be described. A creasing blade 60 is provided on the roller 13, which extends radially from the roller and longitudinally thereof and is held in the roller by a wedge 62, which wedge is held in the roller by screws 63. A bar 65 is countersunk longitudinally in the roller 12 and is provided with a longitudinal slot 66 in which is oscillatively mounted a gripping jaw 67 which is adapted to co-act with a gripping jaw 68 formed by one edge of the slot 66 to grip the web 7 as will be described. An arm 69 is secured to one end of the jaw 67, on which arm is journaled a roller 70 which engages a cam 71 to open the jaws 67 and 68 and to permit closing of said jaws under the tension of springs 72. The creaser blade 60 is adapted to project between and press the web 7 between the jaws 67 and 68 when said blade and said jaws come together during the rotation of the rollers 12 and 13. As soon as said blade and said jaws are rotated past each other and are disengaged, the cam 71 is in such relation to the roller 70 that the springs 72 press the jaw 67 toward the jaw 68 whereby the jaws grip the sheet between them and crease the sheet on the line upon which it is later folded. A creaser blade 75 similar to the blade 60 is provided on the roller 30 and is held in said roller by wedge 76, which wedge is held in the roller by screws 77. A bar 78 is countersunk longitudinally in the roller 29 and is provided with a longitudinal slot 79 in which a gripping jaw 80 is oscillatively mounted which jaw is adapted to co-act with a gripping jaw 81 formed by one edge of the slot 79 to grip the web 25. An arm 82 is secured to one end of the jaw 80, on which arm is journaled a roller 85 which engages a cam 86 to open the jaws 80 and 81 and to permit closing of said jaws under tension of springs 87. The creaser blade 75 and the jaws 80 and 81 operate to crease the web 25 in the same manner in which the web 7 is creased by the blade 60 and jaws 80 and 81. Preferably there is only one cutting knife on the rollers 13 and 30 and as the diameter of said rollers and the rollers 12 and 29 is the same said knives cut the paper webs 7 and 25 once in a revolution of the rollers and the length of the sheet cut from the web is the same as the circumference of the rollers. Preferably there is only one pair of gripping jaws on the rollers 12 and 29, which jaws are located 180° from the knife co-acting members 36 and 48 and 180° from the cutting position of the knives 35 and 45. Hence the gripping jaws 67 and 68 and the gripping jaws 80 and 81 crease the sheets, cut by the knives 35 and 45, midway between their ends. The relative position of the cutting devices and the creasing devices on the rollers 12 and 13 and the rollers 29 and 30 is such that when the webs 7 and 25 are brought together the forward edge of one web will coincide with the crease of the other web. Pins 90 project from the roller 12 which are adapted to stick through the web 7 just behind the point where the web is creased on said roller and through the forward end of the web 25, so as to carry said forward end of the web 25 away from the roller 29 and bring it adjacent the crease in the web 7, as shown in Fig. 15, so that the forward leaf of the sheet cut from the web 25 will be folded between the leaves of the sheet cut from the web 7 as shown in Fig. 17. The rollers 13 and 10 are provided with recesses 91 and 92 respectively adapted to receive the pins 90, when said pins are adjacent said rollers. Pins 93 projected from the roller 29, which are adapted to stick through the web 25, just behind the point where the web is creased on said roller, and through the forward end of the web 7, so as to carry said forward end of the web 7 away from the roller 12 and bring it adjacent the crease in the web 25, as shown in Fig. 17, so that the forward leaf of the sheet cut from the web 7 will be folded between the leaves of the sheet cut from the web 25 as shown in Fig. 18. The rollers 30 and 28 are respectively provided with recesses 95 and 96 which are adapted to receive the pins 93 when said pins are adjacent said rollers. The roller 12 is provided with a series of annular grooves 100 in its periphery in which fingers 101 are respectively mounted upon a rock shaft 105 which extends longitudinally through said roller. The bar 65 and the jaw 66 are respectively provided with slots 106 and 107 which register with each other and with the respective grooves 100 so as to receive the fingers 101 below the periphery of the roller. An arm 108 is secured to one end of the rock shaft 105 in which arm is journaled a roller 106. Pins 109 and 110 respectively extend from the arm 108 and the end of the roller 12 to which pins are connected the ends of a spring 111 which is adapted normally to hold the arm 108 and the shaft 105 in such position as to retain the fingers 101 within the grooves 100 and the slots 106 and 107 below the periphery of the roller 12. A lug 115 projects from the frame 2 into the path of travel of the roller 106 and is adapted to be engaged by said roller when the roller 12 rotates to such position that the gripping jaws 66 and 68 are in the position shown in Fig. 16, whereby the arm 108 and rock shaft 105 are rocked and the fingers 101 swung outwardly against the tension of the spring 111, to push the creased edge of the sheet outwardly from between the gripping jaws 66 and 68 and to push said sheet and the forward end of the sheet from the web 25 off the pins 90. The means for rotating the rollers 10, 12, 13, 29, 30 and 28 will now be described. On journal 120 of the roller 12 is secured a pulley 121 which may be driven through the medium of a belt by any suitable power not shown, to rotate the roller 12 in the direction of the arrow in Fig. 3. A gear 122 is secured on the other journal 123 of the roller 12, which gear meshes with gears 124, 125 and 126 secured respectively on the journals 127, 128 and 129 of the rollers 10, 13 and 29 respectively through the medium of which gears the rollers 10, 13 and 29 are driven in the direction of the arrows in Fig. 3. The gear 126 in turn meshes with gears 130 and 131 on the journals 132 and 133 of the rollers 28 and 30 respectively whereby said rollers are driven in the direction of the arrows Fig. 3. A hand wheel 135 is also secured on the journal 120 by means of which the roller 12 and the rollers 10, 13, 29, 28 and 30 through the medium of gears 124, 125, 126, 130 and 131 may be rotated by hand. The roller 29 is provided with a series of annular grooves 140 into which respectively project a series of fingers 141 which fingers are reciprocatively mounted in a supplemental frame 142 which is supported upon the main frame 2 and the frame member 17. The bar 78 and the jaw 80 are provided with slots 143 and 144 which register with the grooves 140 in the roller 29 and form part of said grooves so that the fingers 141 may move through said bar and jaw. The forward ends of the fingers 141 are connected to a rod 145 which rod extends across the frame 142 and is connected to arms 146 which are secured on rock shaft 147 journaled in the frame 142. An arm 150 is secured on the rock shaft 147 to which is connected one end of a cam rod 151, the other end of which is forked and straddles journal 152 of roller 29. A roller 155 is journaled on the forked end of rod 151, which roller works in a cam 156 secured on the journal 152 whereby the fingers 141 are actuated, through the medium of said rod, arm 150, shaft 147, and arms 146, to eject the creased edge of the sheet on the roller 29 from between the jaws 80 and 81, and said sheet and the forward leaf of the sheet on the roller 12 from the pins 93 as shown in Fig. 18. The sheets when disengaged from the rollers 12 and 29, drop upon a conveyer 160, whereby the interfolding of the sheets is completed and the sheets are conveyed by the conveyer in an interfolded and packed condition away from said rollers, as illustrated in Figs. 15 to 20 inclusive. Said conveyer comprises a series of belts 161 which extend over pulleys 162 and 163 secured on shafts 164 and 165 journaled in the frame 142. On the shaft 164 is secured a ratchet 166, engaged by a pawl 167 pivoted to an arm 168 loosely mounted on shaft 164. The pawl 167 is pressed into engagement with ratchet 166 by a spring 169 on the arm 168. Said arm is connected to an arm 146 by link 170, so that when the arms 146 are oscillated, as hereinbefore described, the arm 168 is oscillated and the pawl 167 engages the ratchet 166, whereby the conveyer 160 is intermittently advanced to convey the interfolded and packed sheets from the rollers 12 and 29. A friction device 175 acts upon the shaft 164 to prevent any backward movement of the conveyer. Dogs 180 are adapted to engage the lower edges of the sheets to prevent said sheets slipping backward off the conveyer 160. The friction device 175 comprises a shoe 176 pivoted on the frame member 17 and engaging the shaft 164 and a spring 177 secured on said frame member and pressing said shoe into engagement with said shaft. Friction devices 185 and 186 are applied respectively to the shafts 5 and 6 to hold said webs under tension so that they will not unwind freely.

The operation of the machine as above described may be briefly stated as follows:

The web 7 is threaded between the rollers 10 and 11, then between the rollers 12 and 13; and the web 25 is threaded between the rollers 27 and 28, then between the rollers 28 and 29, and then between the rollers 29 and 30. The relative position of the cutters and creases of the rollers 12 and 13 and the rollers 29 and 30 is such that they cut and crease the web at such positions with relation to each other that when the webs are brought together during the rotation of the rollers between the rollers 12 and 29, the forward edge of one web coincides with the crease of the other web, as illustrated in Fig. 15, in which view the forward edge of the web 25 coincides with the crease in the web 7. In the position of the rollers and webs as shown in Fig. 15, the web 7 has been creased and the crease of the web is between the jaws 66 and 68 on the roller 12; the pins 90 projects through the web 7 near the crease and through the web 25 near its forward end; the knife 60 has cut the web 7 into a sheet $x$; the creaser blade 75 has pressed the web 25 between the jaws 80 and 81 on roller 29; the pins 93 project through the web 25, and the forward end of the sheet $x$ has been gripped by and passed between the rollers 12 and 29 and has dropped on the conveyer 160 and folded on its crease. As the rollers rotate in the direction of the arrows from the position shown in Fig. 15, the creaser blade 45 withdraws from the jaws 80 and 81; the jaws are caused to grip and crease the web 25, and the fingers 101 swing outwardly and throw the creased part of the sheet $x$ and the forward end of the web 25 off the pins 90 (the jaws 66 and 68 being open at this position) as illustrated in Fig. 16. In this view the forward leaf of sheet $x$ is folded downwardly on its crease. As the rollers continue to rotate, the crease in the web 25 and the rear edge of the sheet and the forward end of the web 7 which follows the rear edge of sheet $x$ are first brought between the rollers 12 and 29 in coincidence with each other; the pins 93 are stuck through said forward end of web 7; the web 25 is cut by knife 45 into a sheet $y$; the web 7 following sheet $x$ is pressed by creaser blade 60 between the jaws 66 and 68 for creasing; the crease in the web 25, the rear edge of the sheet $x$ and the forward end of the web 7 following sheet $x$ are then gripped by and brought forward from between the rollers 12 and 29 with the roller 29 and the forward leaf of sheet $y$ is interfolded between the leaves of the sheet $x$ as shown in Fig. 17. As the rollers continue their rotation, the blade 60 withdraws from between the jaws 66 and 68 and the jaws grip and crease the following web 7, and the fingers 141 are moved forwardly against the sheet $y$, whereby the creased edge of the sheet $y$ is disengaged from jaws 80 and 81, and said creased edge and the forward edge of the following web 7 are thrown off the roller 29, whereupon the creased edge of the sheet $y$ drops upon the conveyer 160, as illustrated in Fig. 18. As the rollers continue their rotation the rear leaf of the sheet $y$ is gripped by and brought between the rollers 12 and 29 and the sheet folded upon its crease; the blade 35 cuts a succeeding sheet $z$ from the web 7, the forward leaf of which is interfolded with the sheet $y$ and the blade 45 presses the web 25 between jaws 80 and 81 for creasing, as shown in Fig. 19. The position of the rollers in Fig. 19 corresponds to their position shown in Fig. 15 and the above described operations constitute the cycle of operation of the machine. Upon further rotation of the rollers the above described operations are repeated, the sheet $z$ taking the place of the sheet $x$ and the following sheet cut off the web 25 taking the place of sheet $y$ and so on as illustrated in Fig. 20, whereby the sheets are interfolded and packed into a package as shown in Fig. 14 and conveyed from the machine by the conveyer 160. Any number of interfolded sheets and packages of any length may be disengaged from the long package of sheets which are conveyed from the rollers by the conveyer. The packages of interfolded sheets may then be used as a paper towel dispenser as paper towels or otherwise.

I claim:

1. A machine of the character disclosed comprising two pairs of rollers, means for feeding a web between each pair of rollers, one of each of said pairs of rollers co-acting with one of the other pair, means on each pair of rollers for cutting the web passing therebetween into definite lengths, and means on each pair of rollers for creasing the web passing therebetween, said co-acting rollers being adapted to carry said webs and the sheets cut from the webs between them, said cutting means and said creasing means being so positioned on the rollers that when said webs and the sheets cut therefrom pass between said co-acting rollers, the transverse edges of each web will coincide with the creases in the other web, and means for folding the sheets on their creases and interfolding the leaves of the sheets as they pass from between said co-acting rollers and means for ejecting the interfolded sheets from said co-acting rollers when the sheets are ejected therefrom.

2. A machine of the character disclosed comprising two pairs of rollers, means for feeding a web between each pair of rollers, one of each of said pairs of rollers co-acting with one of the other pair, means on each pair of rollers for cutting the web passing therebetween into definite lengths, jaws on one of each pair of rollers, a blade on the other of each pair of rollers for pressing the webs between said jaws, as said blade and jaws come together during the rotation of the rollers, means for swinging said jaws together to grip and crease the web therebetween as said blade withdraws from the jaws during rotation of the rollers, said co-acting rollers being adapted to carry said web and sheets cut from the webs between them, said cutting means and said creasing means being so positioned on the rollers with relation to each other that when said webs and the sheets cut therefrom pass between said co-acting rollers, the transverse edges of each web will coincide with the creases in the other web, and means for folding the sheets on their creases and interfolding the leaves of the sheets as they pass from between said coacting rollers and means for ejecting the interfolded sheets from said co-acting rollers.

3. A machine of the character disclosed comprising a frame formed in two parts hinged together, a pair of rollers journaled in each of said frame parts, one of each of said pairs of rollers co-acting with one of the other pair, said frame parts being adapted to swing on their hinge to separate said pairs of rollers, means on each pair of rollers for cutting the web passing therebetween into definite lengths, means on each pair of rollers for creasing the web passing therebetween, said co-acting rollers being adapted to carry said webs and the sheets cut therefrom between them, said cutting means and said creasing means being so positioned on the rollers that when said webs and the sheets cut therefrom pass between said co-acting rollers the transverse edges of each web will coincide with the creases in the other web, and means for folding the sheets on their creases and interfolding the leaves of the sheets as they pass from between said co-acting rollers and means for ejecting the interfolded sheets from said co-acting rollers.

4. Mechanism for cutting and interfolding sheets, which consists in the combination of two pairs of cylinders arranged in parallel relation, the cylinders of each pair having coöperating cutting means formed thereon, gripper means carried by one cylinder of each pair for alternately folding the web sections detached by said cutting mechanism, creasing means carried by the other cylinder of each pair and arranged to coöperate therewith, and feeding means for engaging the leading ends of the detached sections for causing the cut end of one section to lie within the fold of the other section.

5. Mechanism for cutting and interfolding sheets, which consists in the combination of two pairs of cylinders arranged in parallel relation, the cylinders of each pair having coöperating cutting means formed thereon, positively actuated gripper means carried by one cylinder of each pair for alternately folding the web sections detached by said cutting mechanism, creasing means carried by the other cylinder of each pair and arranged to coöperate therewith, and feeding means for engaging the leading ends of the detached sections for causing the cut end of one section to lie within the fold of the other section.

6. Mechanism for cutting and interfolding sheets, which consists in the combination of two pairs of cylinders arranged in parallel relation, the cylinders of each pair having coöperating cutting means formed thereon, gripper means carried by one cylinder of each pair for alternately folding the web sections detached by said cutting mechanism, creasing means carried by the other cylinder of each pair and arranged to coöperate therewith, and projecting pins for engaging the leading ends of the detached sections for causing the cut end of one section to lie within the fold of the other section.

7. Mechanism for cutting and interfolding sheets, which consists in the combination of two pairs of cylinders arranged in parallel relation, the cylinders of each pair having coöperating cutting means formed thereon, gripper means carried by one cylinder of each pair for alternately folding the web sections detached by said cutting mechanism, creasing means carried by the other cylinder of each pair and arranged to coöperate therewith, feeding means for engaging the leading ends of the detached sections for causing the cut end of one section to lie within the fold of the other section, and fingers for ejecting the interfolded sheets.

8. Mechanism for cutting and interfolding sheets, which consists in the combination of two pairs of cylinders arranged in parallel relation, the cylinders of each pair having coöperating cutting means formed thereon, gripper means carried by one cylinder of each pair for alternately folding the web sections detached by said cutting mechanism, creasing means carried by the other cylinder of each pair and arranged to coöperate therewith, feeding means for engaging the leading ends of the detached sections for causing the cut end of one section to lie within the fold of the other section, and fingers for ejecting the interfolded sheets, said cylinders having grooves formed therein, and ejecting fingers for the interfolded sheets lying within said grooves.

9. In a machine for cutting and interfolding sheets, two pairs of cylinders arranged parallel to each other, the cylinders of each pair having coöperating cutting means formed thereon, gripper means carried by one cylinder of each pair for alternately gripping and folding the web sections detached by said cutting mechanism, creasing means carried by the other cylinder of each pair and arranged to coöperate therewith, feed means for engaging the leading ends of the detached sections for causing the cut end of one section to lie within the fold of the other section, means for ejecting the interfolded sheets, and conveying means for receiving the sheets as they are ejected.

10. In a machine for cutting and interfolding sheets, two pairs of cylinders arranged parallel to each other, the cylinders of each pair having coöperating cutting means formed thereon, gripper means carried by one cylinder of each pair for alternately gripping and folding the web sections detached by said cutting mechanism, creasing means carried by the other cylinder of each pair and arranged to coöperate therewith, feed means for engaging the leading ends of the detached sections for causing the cut end of one section to lie within the fold of the other section, means for ejecting the interfolded sheets, and intermittently actuated conveying means for receiving the sheets as they are ejected.

In testimony whereof, I have hereunto set my hand at San Francisco, California, this 24th day of September, 1915.

GUSTAV A. AICHER.

In presence of—
ALAN FRANKLIN,
P. S. PIDWELL.